Figure 8:
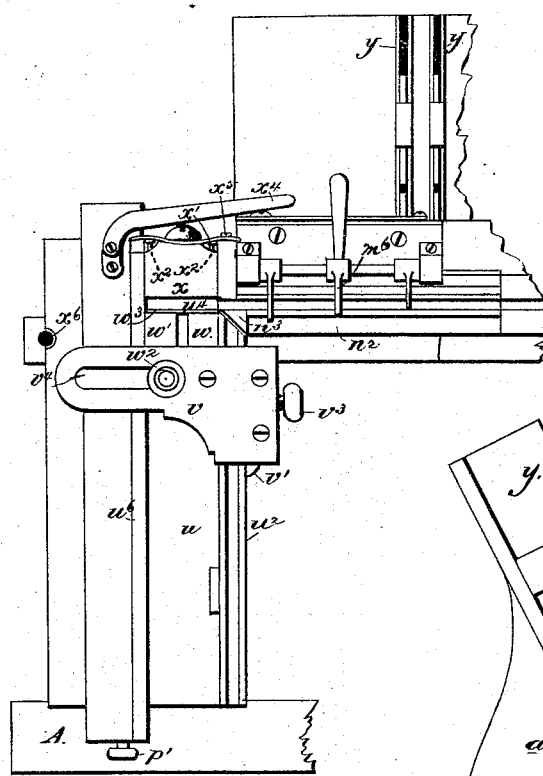
Figure 8A:
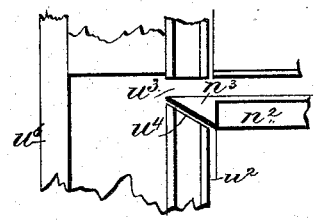

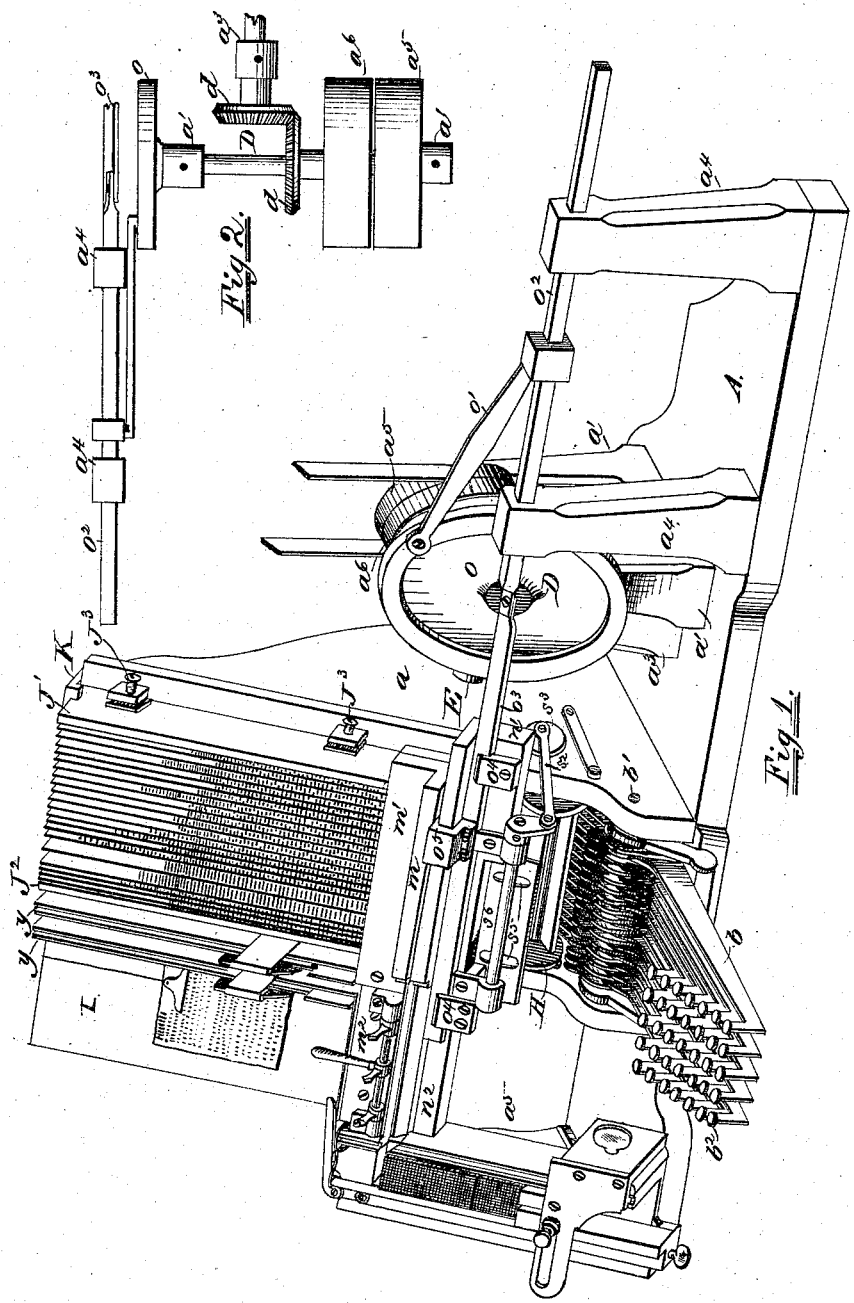

7 Sheets--Sheet 2.
J. W. PAIGE.
Type-Setting Machines.
No. 157,694. Patented Dec. 15, 1874.
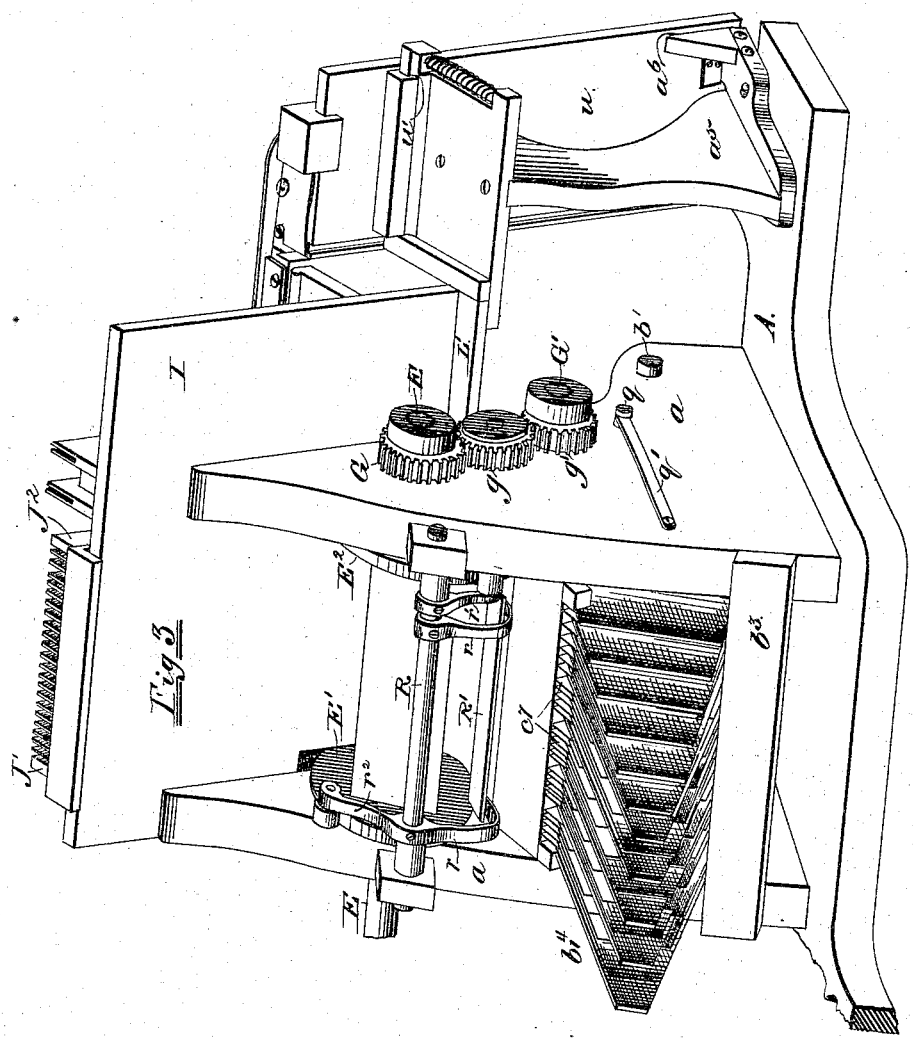
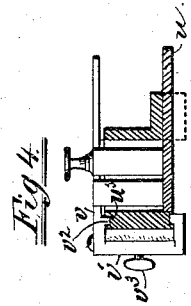
Witnesses:
Harry C. Clark
H. E. Matthews
Inventor:
James W. Paige.
by H. W. Beadle & Co.
Attys.

J. W. PAIGE.
Type-Setting Machines.
No. 157,694.
7 Sheets--Sheet 3.
Patented Dec. 15, 1874.
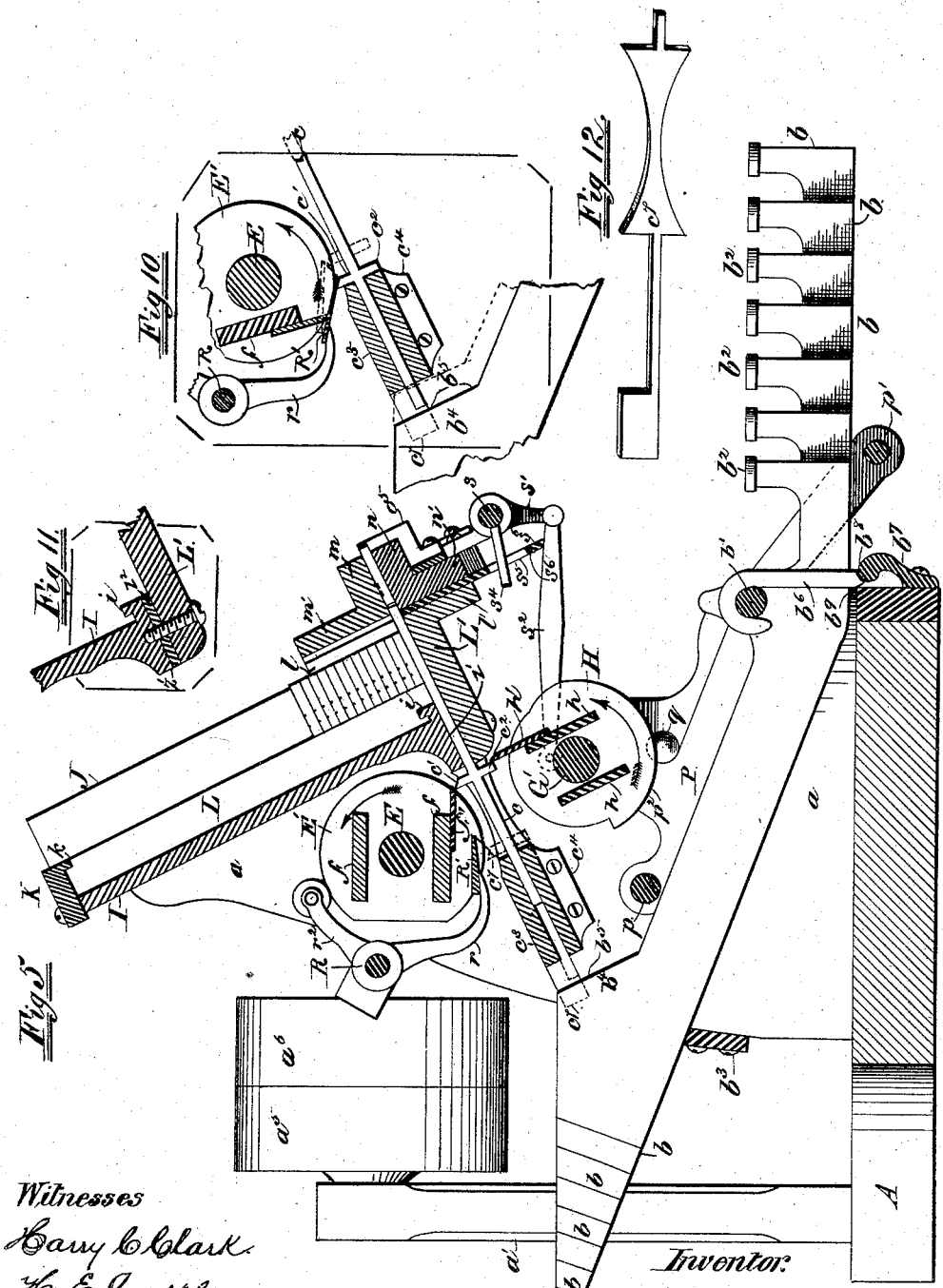
Witnesses
Harry C. Clark
H. E. Matthews
Inventor:
James W. Paige.
By H. W. Beadle & Co.
Attys.

7 Sheets—Sheet 4.
J. W. PAIGE.
Type-Setting Machines.
No. 157,694.        Patented Dec. 15, 1874.
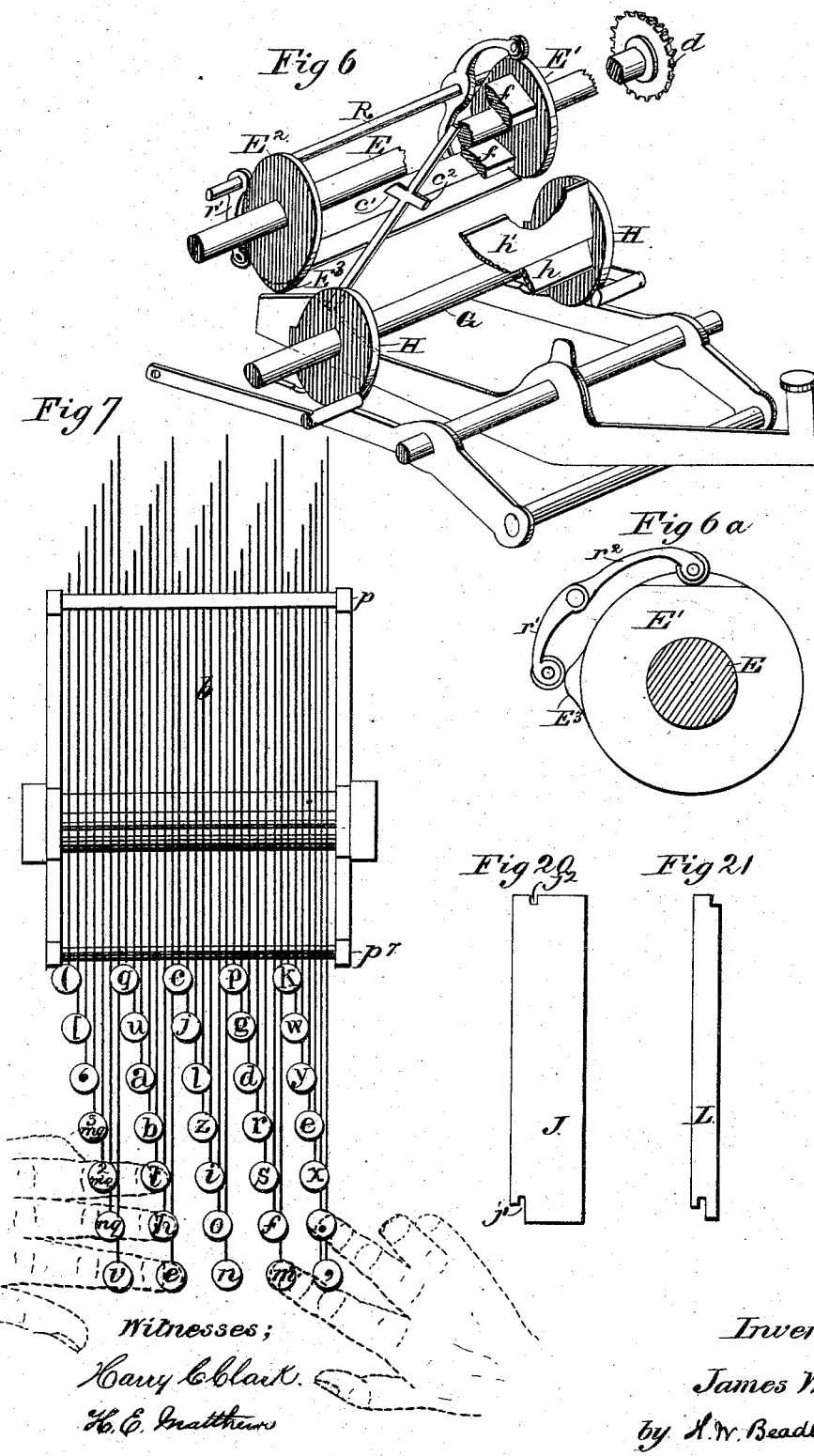

7 Sheets--Sheet 5.

J. W. PAIGE.
Type-Setting Machines.

No. 157,694. Patented Dec. 15, 1874.

Witnesses;
Harry C. Clark,
H. E. Matthews.

Inventor.
James W. Paige.
by H. W. Beadle & Co.
Att'ys.

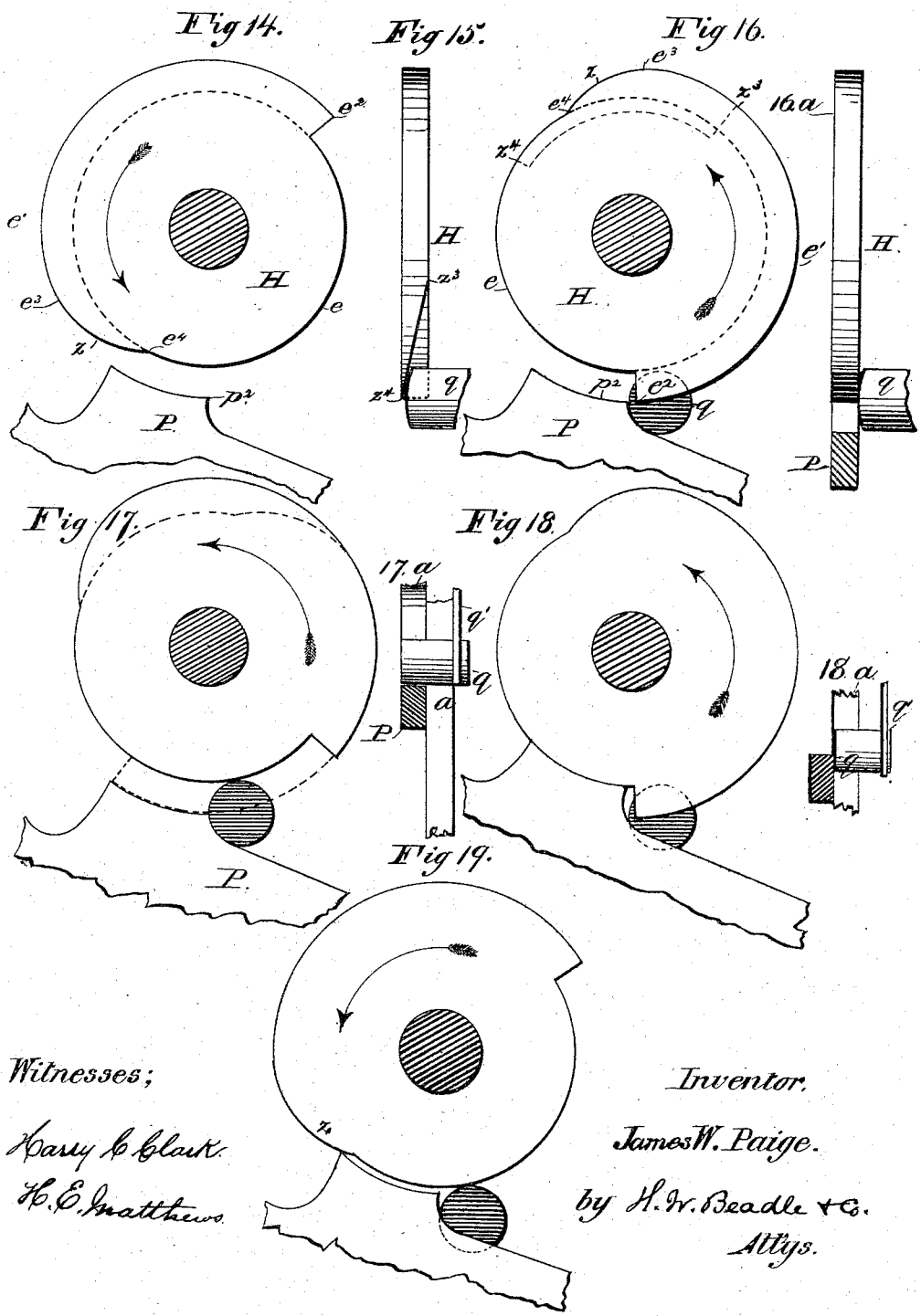

J. W. PAIGE.
Type-Setting Machines.
No. 157,694.
Patented Dec. 15, 1874.
7 Sheets--Sheet 7.
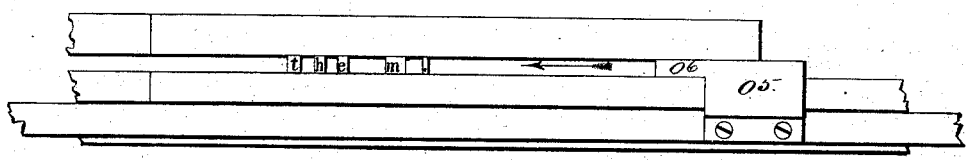
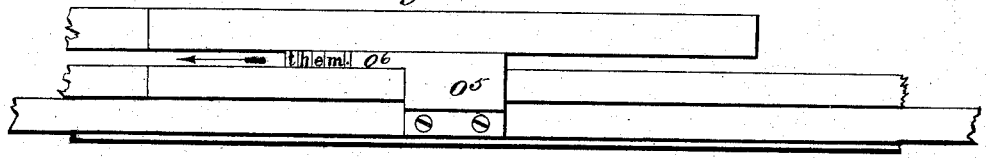
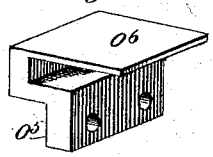
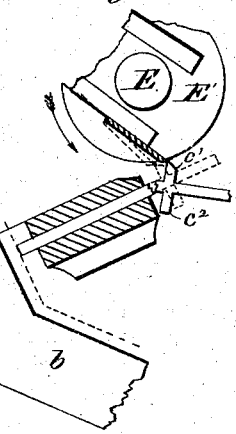
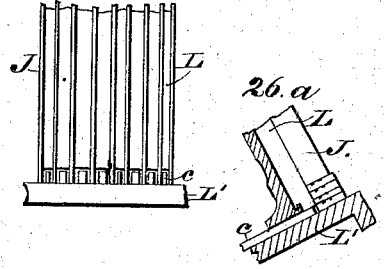
Witnesses:
Harry C. Clark
H. C. Matthews
Inventor.
James W. Paige
By H. W. Beadle & Co.
Attys.

UNITED STATES PATENT OFFICE.

JAMES W. PAIGE, OF ROCHESTER, NEW YORK.

IMPROVEMENT IN TYPE-SETTING MACHINES.

Specification forming part of Letters Patent No. 157,694, dated December 15, 1874; application filed August 13, 1872.

*To all whom it may concern:*

Be it known that I, JAMES W. PAIGE, of Rochester, in the county of Monroe and State of New York, have invented a certain Improvement in Type-Setting Machines, of which the following is a specification:

This invention is an improved type-setting machine, adapted, by means of its special construction, to set type more rapidly and accurately than has been before done, it being so constructed as to be capable of setting combinations of letters, forming syllables, words, and parts of words, as may be selected by the operator, and arranging the same almost instantly in the line of composition, this result being accomplished in what may be termed a single impulse of the machine, the individual parts co-operating to produce this result making but a single operative movement, and this perfected result being completely accomplished before the succeeding batch is set. These impulses of the machine follow each other in rapid succession, so that the combinations of letters selected by the operator at each impulse may be added in groups to the line of composition with great rapidity.

Its novelty consists, mainly, first, in the employment of a peculiarly-constructed type-case, a type-forcer, moved by power independent of that exerted in manipulating the keys, and a type-race, and in the combination of these elements with other elements hereinafter described; second, in the combination, with mechanism for controlling the movements of the selecting mechanism, of an automatically-operating time-lock, adapted in the practical operation of the machine to unlock the selecting mechanism at such intervals only as will render absolutely certain the setting of the type; third, in the employment, broadly, of a guard-plate adapted to retain in a proper forward position such type-forcers as have received their full initial movement, and to return to their normal position such forcers as have received only a partial initial movement; fourth, in the employment, broadly, of an automatic gate adapted to rise behind the type moved into the race by the forcers, and prevent them from sliding backward out of the race again, the same being adapted also to furnish, in part, a proper bearing-surface for them to slide upon when actuated by the type-driver; fifth, it further consists in the legitimate combinations of the elements referred to, and in certain features not yet alluded to, and in certain details of construction of these and other parts of the machine, all of which will be fully described hereinafter.

Figure 9:
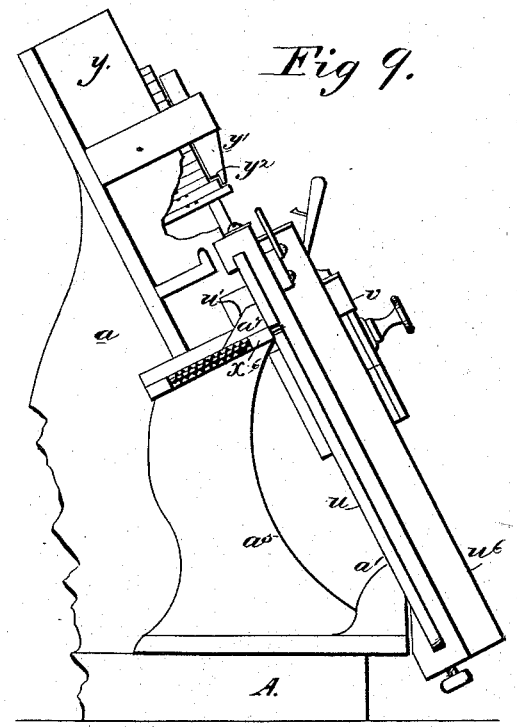

In the drawings, Figure 1 represents a perspective view of my improved machine, taken from the front side. Fig. 2 represents a plan view of the main shaft and its immediate connections. Fig. 3 represents a partial perspective view of my improved machine, taken from the rear side. Fig. 4 represents a transverse sectional view of the galley. Fig. 5 represents a vertical sectional elevation of the machine. Fig. 6 represents a perspective view of a single selecting-key, a single type-forcer, the carriers for actuating the forcer, the holding-down and releasing mechanism, and the time-lock mechanism used in connection therewith, detached from the other parts. Fig. $6^a$ represents a side elevation of the cams for operating the guard-plate. Fig. 7 represents a plan view of the key-board and the arms for holding down and releasing the keys. Fig. 8 represents a front elevation of the space-holder, the justifying mechanism, and the galley; Fig. $8^a$, an enlarged view of the end of the composing-stick and the adjacent parts of the galley. Fig. 9 represents a side elevation of the space-holders and the galley. Figs. 10, 11, 12, and 13 represent views of various parts detached; Fig. $13^a$, a perspective view of the T-shaped plate L' and automatic gate $s^6$; Figs. 14 to 19, inclusive, views of the time-lock mechanism; Figs. 20 and 21, views of a division-strip and spacing-bar; Figs. 22 and 23, an illustration of the action of the type-driver in composing a word; Fig. 24, a perspective view of the type-driver; Fig. 25, an illustration of what might occur if the time-lock were not employed to prevent an incomplete movement of the type-forcers; and Figs. 26 and $26^a$, views of the position of the forcer relatively to the type-case and types.

To enable others skilled in the art to make and use my invention, I will now proceed to fully describe its construction and manner of operation.

The operation of the machine may be generally described as follows: It is provided with a series of selecting-keys, each having its proper character inscribed thereon, and each key adapted, when operated, to give its corresponding type-forcer an initial movement in a forward direction, by means of which it is brought within the range of the movement of a carrier, by which said forcer is moved forward to force a type from the case into the type-race or composing-stick. The type-case has each letter-type channel thereof constructed to be of a suitable width to accommodate its special line of types therein, edge against edge, so that when the lowermost type is delivered into the race or composing-stick by the forcer it lies in proper position for composition—that is, upon its edge—and may be swept sidewise into its place in the line of composition by the next forward movement of the type-driver. An auxiliary time-lock is employed in connection with other mechanism for holding down and releasing the keys, by means of which the latter, in the practical operation of the machine, are unlocked only for an instant, at regular intervals; but when unlocked the full depression of a key will render absolutely certain the setting of a type. A guard-plate also is employed, by means of which those forcers which have been given their full initial movement by the full depression of the selecting-keys are not permitted to slide backward again, but are held within the range of the movement of the carrier, by the operation of which they are carried farther forward to force the type into the composing-stick. Those forcers also which have not received their full initial movement, but have been only partially or incompletely moved, are returned to their normal position by the operation of this guard-plate.

An automatic gate also is employed, by means of which the types forced into the race are prevented from sliding backward out of the race again, and are also suitably supported when moved into the line of composition by the type-driver. All these parts work in harmony, so that any number of keys being fully depressed each one will give its corresponding type-forcer its full initial movement, so that it will be brought within the range of the movement of the carrier, and be taken forward to force the corresponding type from the case into the race or composing-stick, the whole number so moved being swept into the line of composition sidewise by a single movement of the driver; but if any keys undesignedly or accidentally touched in the rapid manipulation of the key-board are not fully depressed, at this time they will give to their corresponding forcers a partial initial movement only, and consequently the said forcers will not be moved forward within the range of the carrier's movement, but will be returned to their normal position by the guard-plate.

The following terms are employed to designate the different parts of the type: The end with the character on is the "face;" the end opposite thereto is the "foot;" the part on which the manufacturer's nick is placed, the "upper edge;" opposite thereto, the "lower edge." The two remaining parts are sides. From edge to edge, the "height or gage;" from side to side, the "width;" and from face to foot, the "length."

For convenience of description, the several mechanisms will first be described under separate heads.

I. *The frame-work.*—A, Figs. 1, 3, and 5, represents a base-plate, of any proper size and suitable material, which is itself supported in any proper manner. $a\ a$ represent side pieces or plates, of suitable form, as shown, which are strongly secured to the base-plate, in any proper manner. $a^1\ a^1$ represent standards rising from the base-plate, which furnish proper bearings for the main shaft D of the machine. $a^3$ represents a similar standard, furnishing a bearing for one end of the auxiliary shaft, as shown, the other being supported in bearings in the side plates $a\ a$ above referred to. $a^4\ a^4$, Figs. 1 and 2, represent similar standards, furnishing bearings for the reciprocating bar $o^2$ of the type-driver. $a^5$, Figs. 1, 3, and 9, represents a standard, of suitable conformation, which is provided with inclined bearing-surfaces $a^6\ a^6$, adapted to support the galley $u$.

II. *The mechanism for selecting the forcers for ejecting the desired types.*—$b\ b\ b\ b$ represent a series of keys, of similar conformation, as shown in Figs. 1 and 5, but varying in length, which are constructed of any suitable size and material, steel being preferred, and are journaled upon the shaft $b^1$, properly supported in bearings in the side plates $a\ a$. $b^2\ b^2\ b^2\ b^2$ represent buttons, having suitable characters inscribed thereon, which are removably or permanently attached to the front ends of the keys $b$. $b^3$ represents a banking-plate, by means of which the rear ends of these keys are supported below in the same horizontal plane. $b^4$ represents a projection, formed upon the rear end of each key, which is provided with an inclined bearing-surface, $b^5$, adapted, when operated, to bear against the lower end of the corresponding type-forcer $c$, hereinafter described, and give it its initial movement, as indicated in dotted lines, Fig. 10. $b^6$, Fig. 5, represents washers, located upon the shaft $b^1$ between the keys, by means of which the distance between adjacent keys is determined, and each also is made independent of the other, so that any one of the keys may be moved without affecting in the least, by friction or otherwise, those upon either side. These washers, for convenience of removal, are made hooked-shaped, as shown in Fig. 5, and are retained in position by a clamping-bar, $b^7$, provided with a projection, $b^8$, adapted to rest in corresponding recesses $b^9$ in the shanks of the hooked-shaped washers, the construction being such, as clearly indicated in the drawing, that, by simply fastening the bar in place, the entire series of washers will be securely held.

III. *The type-forcers.*—c c c c represent the type-forcers before referred to, constructed of suitable material and proper size, and provided, above and below, with the transverse flanges or lugs $c^1 c^2$, as shown. These are supported in proper position by means of suitable bearing-plates $c^3 c^4$, Figs. 5 and 10, located at their rear ends, and secured to the side plates $a a$, and the plate $L^1$ and type-case base $z^1$ located near their front ends, as shown.

$c^7 c^7$, Figs. 5, 10, and 12, represent division-strips, by means of which the forcers are separated from each other, and their rear ends held in proper position, the division-strips themselves being properly held by the selecting-keys, between which they rest, as shown in full lines, Fig. 3, and dotted lines, Fig. 10. The front ends of the forcers are held in proper position by the division-strips of the type-case, between which they project, as indicated in Figs. 26 and 26a.

By means of this construction the forcers are held from moving in a lateral direction, but are adapted to slide readily when operated in a longitudinal direction.

From the foregoing it will be understood that when any one or more of the keys is selected and moved by depressing the character-buttons, the rear ends will, consequently, rise and press forward, with the inclined bearing-faces $b^5$, the corresponding type-forcers, the latter being adapted, as described, to move in a longitudinal direction. It will be understood, however, that the selecting-key does not impart to the forcer its complete movement for forcing the type out of the case into the race, but simply selects the same, and gives it an initial movement for the purpose of bringing it within the range of the mechanism hereinafter described, which is operated by power independent of the operator, by means of which said forcer is properly actuated to force out the type.

IV. *The independent mechanism for carrying forward the selected forcer, and for returning the same to its normal position.*—D represents the main shaft, supported by proper bearings in the standards $a^1 a^1$, which is provided with proper pulleys $a^5 a^6$, receiving power from any suitable source. E, Figs. 1, 2, 3, and 5, represents an auxiliary shaft, arranged at right angles to the shaft D, and receiving power therefrom by means of the miter-gear $d d$, Fig. 2, as shown. $E^1 E^2$, Figs. 3, 5, and 6, represent cam-disks, attached to shaft E, and adapted to revolve therewith, which are united together by the intermediate connecting-bars $f f$, Figs. 5 and 6, one of which may be provided with the plate or carrier $f'$, Figs. 5 and 6; but, if desired, the bar may itself be adapted to act as a carrier, or other suitable projecting surface on the shaft may be employed for this purpose. This carrier is adapted to carry forward, in its revolution, such forcers as are brought within the range of its movement by the full depression of the selecting-key, as before described.

The peculiar conformation of the cams above referred to will be described in connection with the mechanism of the guard-plate hereinafter described.

G, Fig. 3, represents a pinion upon the end of the shaft E, which communicates motion therefrom by means of the intermediate idle-wheel $g$ to the pinion $g'$ upon the shaft $G'$, which is supported in suitable bearings in the side plates $a a$, as shown. H H, Figs. 1, 5, and 6, represent cam-shaped disks, of identical construction, secured to this shaft $G'$, and revolving therewith, which are united together by the connecting-bars $h h$, one of which may be provided with a carrier-plate, $h'$, or be itself adapted for a carrier, or the shaft be provided with other suitable projecting surface for the desired purpose. This lower carrier is so placed that, immediately after the upper carrier has given a type-forcer the full desired movement and has revolved away from the upper lug, $c^1$, such lower carrier shall come in contact with the lower lug, $c^2$, as shown in Fig. 5, and thereby return and leave said forcer in its normal position, as shown in Fig. 10.

The peculiar conformation of the cams H H will be described in connection with the time-lock mechanism.

V. *The type-case.*—I, Figs. 1, 3, and 5, represents a plate of suitable dimensions, which is properly attached to the side plates $a a$ at any desired angle, and provided below with the base $z^1$ and grooved flange $i$, as shown in Fig. 5. J J, Figs. 5 and 20, represent division-strips of suitable material and size, which are provided below with the projecting tongue $j^1$, adapted to rest in the groove of the flange $i$ of the main plate, and above with the recess $j^2$, adapted to receive the flange $k$ on the securing-plate K, as shown. L, Figs. 5, 21, 26, and 26a, represents intermediate spacing-bars, located between the division-strips, which may be employed, if desired, to support the strips and furnish a suitable surface for the feet of the types, as shown. These are similar in their construction to the division-strips, being secured in place in the same manner and by the same means, but they are narrower, and also less in length, having this latter construction for the purpose of leaving space below for the passage of the type-forcer. By adjusting these division-strips and spacing-bars the case may be adapted for different fonts or sizes of types. These division-strips are so arranged as to adapt the case for holding the types placed therein edge against edge, the same being arranged with the upper edge, having the manufacturer's nick thereon, uppermost, as shown, by means of which they are so presented to the forcers that, when acted upon by them, they are delivered into the race or composing-stick in proper position for composition. $J^1 J^2$, Figs. 1 and 3, represent side strips of suitable material and size, by means of which the division-strips are retained in place, the side strips themselves being held in place by means of stops, those on one side being provided with set-screws $J^3$, as shown in Fig. 1, by means of which the whole series is securely clamped together. In practice, a proper weight is placed upon the top of each line of types in the case, for the purpose of securing their proper descent as the lowermost types are removed from time to time.

Figure 13:
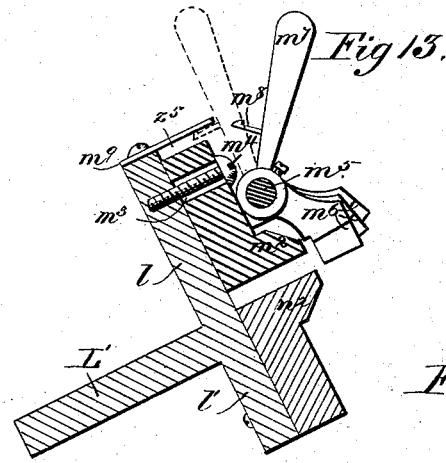
Figure 13A:
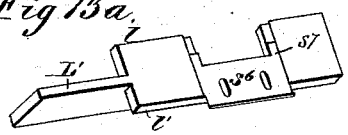

VI. *The type-race or composing-stick.*—$L^1$, Figs. 3, 5, 13, and $13^a$, represents a T-shaped plate, the long arm of which is secured to the base-plate of the type-case, as shown in Fig. 11, but separated therefrom by an intervening washer, $z^2$, at each end, by means of which proper space is left for the passage of the type-forcer, Fig. $26^a$. $l$ represents its upper arm or projection, to which the upper parts of the composing-stick are secured, the same being provided with an opening or cut-away portion in front of the type-case, as shown in Fig. $13^a$, to permit the passage of the types. $l^1$ represents its downward projection, to which the lower members of the composing-stick are secured, as shown. $m$, Figs. 1 and 5, represents the plate or bar forming the upper member of the main portion of the composing-stick, the same being provided with a right-angled flange, $m^1$, by means of which it is secured to the upward projection $l$ of the plate $L^1$, in front of the type-case, in such manner that its lower surface is parallel with the upper edge of the lowermost types in the case. $n$, Fig. 5, represents a plate, forming the lower member of the main portion of the composing-stick; provided also with a right angled flange, $n^1$, by means of which it is secured to the downward projection $l^1$ of the plate $L^1$. These plates, forming the upper and lower members of the main portion of the race or composing-stick, as shown in Fig. 1, may be adjusted to suit different founts of type, or to compensate for wear; but when adjusted to suit the type employed they remain in a fixed position, so that the stick or race is adapted to bear snugly upon the edges of the types forced into the race by the type-forcer, and hold the same securely until moved by the type-driver. The upper member $m$ also serves as a retaining-plate, preventing more than one type from being removed at one time from any division of the type-case. $n^2$, Figs. 1 and 13, represents a plate fixed to the downward projection $l^1$ of the plate $L^1$, which forms the lower member of that part of the type-race or composing-stick which is extended to the left of the type-case, as indicated in Fig. 1. $n^3$, Figs. 8 and $8^a$, represents a triangular block secured to the end of the plate, or which may form a part of the same, the purpose of which will be described hereinafter. $m^2$, Figs. 1, 8, and 13, represents a plate or bar attached to the upward projection of the plate $L^1$, which forms the upper member of the type-race or composing-stick. This plate is adjustably secured, for the purpose of adapting it to clamp and release the line of type between it and the lower member, as may be desired, the special construction and manner of operation being described in connection with the mechanism for justifying the composed lines of type.

VII. *The type-driver.*—$o$, Figs. 1 and 2, represents a crank-wheel, secured to one end of the main shaft D, and adapted, by means of a connecting-rod, $o^1$, to give a reciprocating motion to the bar $o^2$, supported in proper bearings, $a^4$ $a^4$, as shown. $o^3$ represents a suitable bar, attached at one end to the bar $o^2$, and supported in suitable bearings $o^4$ $o^4$ upon the plate $n^1$. $o^5$, Figs. 1 and 24, represents a right-angled plate, attached to the bar $o^3$, which plate is provided with a projecting plate or lip, $o^6$, adapted to lie in the race, and serve, when operated as a type-driver, for collecting or composing the type before driving them beyond the wall $J^2$ of the type-case, as indicated in Figs. 22 and 23.

VIII. *The mechanism for holding down and releasing the keys, and the time-lock mechanism used in connection therewith.*— H H represent the cam-disks upon the shaft $G'$, before referred to. The peculiar conformation of these disks, in side elevation, is shown enlarged in Figs. 14, 16, 17, 18, and 19, in which $e$ represents the curved line inclosing the smaller portion of the cam, the arc of which is completed in dotted lines, to indicate clearly the form and extent of its projecting portion. $e^1$ represents the projecting portion, which, it will be observed, is of equal width for the greater portion of its length—that is, from the point $e^2$ to the point $e^3$—and that from this point it is extended by any easy curve to unite at the point $e^4$ with the line $e$, inclosing the smaller portion of the cam. The peculiar conformation of the edge face of the cam is shown in Fig. 15, the same being regular in its outline, excepting from the point $z^3$ to the point $z^4$, which portion is cut away to form a helical or shearing cam, as shown in Fig. 6, and in dotted lines, Fig. 16, which is adapted to operate as will be hereinafter described. P P, Figs. 5, 6, 14, 16, &c., represent arms of identical construction, journaled upon the shaft $b^1$, upon each side of the keys, and united at their upper ends above the keys by the transverse bar $p$, as shown in Fig. 7, the same being extended also below the keys, and united by a similar bar, $p^1$, for the purpose of counterbalancing the parts. Each of these arms is provided with a projection, having a curved upper face, $p^2$, as shown, adapted to furnish a proper bearing-surface for the cam-disk H to revolve against. This mechanism is adapted for controlling the selecting mechanism, by holding down and releasing the keys at regular intervals.

The time-lock mechanism proper, used in connection with the above, is constructed in the following manner:

$q$, Figs. 1, 3, 5, 6, 15, and 16, &c., represents a bolt adapted to slide longitudinally in proper openings in the side plates $a$ $a$, as shown, and $q'$ springs of suitable construction, which are secured at one end to the side plates $a$ $a$, and at the other to the bolts, as shown, by which means they are adapted to press the bolts (when the latter are released by the cam) inward into such position as to rest upon the arms P P, and prevent the same from being elevated.

The operation of these parts is as follows: The cam-disks H H revolve continuously over the bearing-surface of the arms. During that portion of their revolution when the projecting portion $e^1$ of the disk from the point $e^3$ to the point $e^2$ is passing over these arms they are held in their depressed condition, and consequently the selecting-keys are also held by the transverse bar $p$, and cannot, therefore, be moved. During the remaining portion of the revolution the smaller part $e$ of the cam moves over the projection $p^2$ of the arms P, and consequently the latter may be moved, if not otherwise held. These cams are so timed in their movement, of course, that the smaller portion passes over the bearing-surface $p^2$, and thus releases the keys at the proper time to harmonize with the other movements of the machine.

It will be seen, by inspecting the construction of the cam, that there must be a time in its revolution—that is, when the cam proper $z$ or beveled line $e^3 e^4$ is passing over the bearing-surface $p^2$, as shown in Fig. 14—that the arms will neither be perfectly held nor perfectly released, so that, if a key be moved at this time for the purpose of setting a type, a partial or incomplete movement only will be made, which will either fail to give the forcer sufficient initial movement to place its arm $c^1$ before the carrier-plate, in consequence of which the type will not be set, or may place it in such position as to be caught by the carrier-plate and broken, as indicated in Fig. 25.

To obviate this difficulty the auxiliary time-lock is employed, which is adapted to further limit the time in which the key may be depressed, and to unlock the selecting mechanism only at a time when a type may be set with absolute certainty—that is, when the smaller portion of the cam only is passing over the bearing-surface $P^2$, so that a key may be fully depressed, and the corresponding forcer be given its full initial movement.

The position of the parts when this unlocking action takes place, and, consequently, a key may be depressed, and a type be set with absolute certainty, is shown in Figs. 16 and 16$^a$, in which the point $e^2$ of the projection $e^1$ of the disk is represented as passing over the face of the bolt $q$, which has been sheared out of contact with the arm P by the previous operation of the shearing-cam, as indicated in Figs. 15 and 16$^a$.

It will be seen that the locking-bolt does not hold down the arm at this time, nor does the disk, because the projection of the latter has passed beyond the bearing-face of the arm, and, consequently, the same may be fully elevated by the depression of a key. If, however, a key is not depressed before the point $e^2$ passes off from the face of the locking-bolt, the latter will be no longer held, and will spring inward and lock the arm, as represented in Figs. 17 and 17$^a$, so that no key can be depressed until the next revolution of the disk. If, however, a key is depressed while the point $e^2$ is crossing the face of the bolt, and the arm consequently elevated, as represented in Figs. 18 and 18$^a$, the locking-bolt will be still held in its outward position by the face of the arms, as represented in Fig. 18, until this arm is depressed by the movement of the cam proper Z, or beveled face $e^3 e^4$ of the disk, as represented in Fig. 19.

From the foregoing it will be perceived that when a key is permitted to be depressed, as above described, it will remain in its depressed condition, the rear ends being in the position represented in dotted lines, Fig. 10, while the cam makes a half-revolution, and then will be raised and held in that position for an equal length of time, or nearly so, before it can be again depressed.

This peculiar action is advantageous, because, first, the time of the downward and upward movements are made equal, or nearly so, so that the impulses of the keys, when operated for setting the type, are uniform; and, second, when the key is fully depressed it may remain in that position, and support the forcer, which has received its full initial movement in such forward position until the guard-plate swings down behind it.

The foregoing description of the locking mechanism is complete, as far as the practical operation of the machine is concerned; but by inspecting Fig. 19 it will be perceived that, if the time-lock be held in its outward position after one or more keys have been depressed, a partial or incomplete movement might be made by the accidental movement of another key while the cam $z$, or beveled line $e^3 e^4$, is crossing the bearing-surface of the arm.

This result, however, cannot occur in practice, because the revolution of the disk is so rapid—being about three hundred and sixty revolutions a minute—that, when one key has been depressed, it is impossible to depress another before the key previously depressed has been returned to its normal position; but, even if this be done, by running the machine slowly and quickly moving a second key no harm will result to the machine, nor will any type be set by such accidental movement of the key, as the key subsequently touched will only have an incomplete movement, and consequently the forcer started thereby will not be pushed within the range of the carrier's movement, but will be returned to its normal position by the guard-plate.

By means of this construction, it will be understood, as before described, that the key can only be depressed at regular intervals, and that the time that it remains depressed is always precisely the same, so that the types may be set by a succession of rapid but regular impulses, the selecting mechanism being unlocked, in the practical operation of the machine, only at the time, to insure, with absolute certainty, the setting of the types, the corresponding keys of which have been fully depressed.

IX. *The guard-plate mechanism.*—R, Figs. 3 and 6, represents the shaft supported in proper bearings in the side plates $a\ a$, and provided with the dependent curved arms $r\ r$, having attached thereto the transverse guard-plate R'. $r^1$, Figs. 3, 6, and $6^a$, represents a curved arm adjustably attached to one end of the shaft R, and extending in a downward direction, which is adapted, by means of a friction-roller, to bear against the face of the cam $E^2$, and to receive from the projection $E^3$ of the latter a movement in an outward direction, by means of which the shaft is partially revolved in one direction, and the guard-plate, consequently, given a rearward movement. $r^2$ represents a similar arm extending in an upward direction, and bearing upon the face of the cam $E^1$, as shown in Figs. 3, 6, and $6^a$, which cam is the converse of the cam $E^2$, and is cut away at the proper point to form a cam of opposite character to the cam $E^2$. By means of these two cams, and the bearing-arms described, the guard-plate receives a reciprocating or oscillating movement, which is properly timed to harmonize with the other movements of the machine, and by means of which it is adapted to move in a rearward direction as the carrier approaches it for the purpose of returning any forcers which may have received only a partial initial movement to their normal position, and to move forward again immediately after the passage of the carrier to be in proper position for the next rearward movement. The guard-plate is also so adjusted relatively to the forcers that when they have received their full initial movement it will, in swinging downward on the arc of the circle shown in dotted lines in Figs. 5 and 10, move in behind them and secure them against a backward movement when the rear end of the selecting-key is withdrawn by the depression of the arm. This action of the guard-plate is made in harmony with the selecting mechanism, the time-lock, and the carrier, so that when a key is depressed the corresponding type-forcer will be held in its forward position by the rear end of the key, as shown in dotted lines, Fig. 10, until the guard-plate swings behind it, and the guard-plate in turn will hold the said forcer in such position until it is taken forward by the carrier to eject the type.

X. *The automatic gate.*—s, Figs. 1 and 5, represents a shaft secured in bearings attached to the plates $n^1$, as shown, which shaft is provided with a crank, $s^1$, as shown. $s^2$ represents a connecting-rod, uniting the crank $s^1$ to the disk $s^3$, upon the outer edge of the shaft G.

By means of this construction it will be understood that by the revolution of the shaft G' the shaft $s$ receives a rocking movement.

$s^4\ s^4$ represent arms secured at one end to the shaft $s$, with their other ends projecting through the elongated slots $s^5$ in the gate $s^6$. This gate $s^6$ consists of a suitable metal strip provided at each end with projections $s^7$, as shown in Fig. $13^a$, and adapted to slide in the recess of the plate $L^1$, as shown.

It will be understood that by means of this construction the gate is adapted to rise behind the types after they have been forced into the race, for the purpose of preventing them from moving backward out of the race again, it remaining stationary in this position during that period in which the type-driver is composing the types and placing them in the line of composition, this stationary condition resulting from the movement of the arms in the elongated slots, which of course produces no motion.

After the types have been delivered by the driver the gate is moved in a downward direction, and caused to remain stationary in that position for the reason before stated, in order to permit other types to be ejected into the race.

XI. *The justifying mechanism.*—$m^2$ represents the plate before referred to as adjustably attached to the upper projection of the plate $L^1$, as shown in Figs. 1, 8, and 13. $m^3\ m^4$ represent elongated slots and screws or pins, by means of which it is secured to the upper projection $l$ of the plate $L^1$, as shown. $m^5$ represents a shaft supported in proper bearings attached to the plate $m^2$, which is provided with two or more dividers, $m^6\ m^6$, located at regular distances apart, but secured in different horizontal planes, as shown in Fig. 13. This is also provided with a handle, $m^7$, having a rearward-projecting catch, $m^8$, as shown. $m^9$ represents a spring-plate rigidly secured at one edge to the upper edge of the upper projection $l$ of the plate $L^1$ in such manner that an intervening space, $z^5$, is left between it and the upper edge of the plate $m^2$, which space is adapted to receive the catch $m^8$ of the handle or lever $m^7$.

From this description it will be readily understood that when the handle is moved into its backward position, as indicated in dotted lines, Fig. 13, the pressure of the spring-plate will consequently depress the handle, and also the loose plate to which it is attached, and therefore that the line of types resting upon the lower member of the composing-stick will be securely clamped. When this handle, however, is drawn forward the plate is not forcibly depressed, but simply rests with its own weight upon the line of type, and the latter may be readily moved in any desired direction.

The dividers $m^6\ m^6$ being located in different horizontal planes it follows that when depressed their points will enter the line of type in the composing-stick below them successively, so that the first may be depressed sufficiently to hold the end of the line, while the second rests upon the top of the line, and indicates where the first division of types should end. When the proper division of the types has been made at or near this point the handle is further depressed, whereby the second divider is caused to enter the line and to form, with the first divider, walls, against which the type contained between them may be justified. This same result, of course, may be accomplished with each succeeding divider. These dividers are adjustable longitudinally upon the shaft in any proper manner for the purpose of adapting them to indicate divisions of any desired length.

XII. *The galley.*—$u$, Figs. 4, 8, and 9, represents the main plate, provided upon its rear side with a block, having the projecting beveled-edged flange $u^1$, adapted to hook over the plate $a^7$ upon the standard $a^5$, which has a corresponding edge, as shown. It is further provided upon one side with a fixed plate, $u^2$, attached thereto at right angles, and having the horizontal recess $u^3$, Fig. 8$^a$, and inclined face $u^4$, the latter being adapted, when the galley is in place, to make a close connection or joint with the block $n^3$ upon the lower member $n^2$ of the composing-stick. It may also be provided, if desired, with a vertical groove, $u^5$, Fig. 4, adapted to guide the supporting-plate $v$ in its movement. $u^6$ represents a loose side piece, adapted in any proper manner for adjustment to receive a column of any desired width. $v$ represents a plate, provided with a right-angled flange, $v^1$, and projection $v^2$ adapted to slide in a guiding-groove, $u^5$, of the galley, and also with a set-screw, $v^3$, by means of which the plate $v$ is held in any desired position, said plate also being provided with the horizontal slot $v^4$, as shown. $w$, Fig. 8, represents a supporting-block, securely attached to the inner face of the plate $v$, which may be so fitted, if desired, as to guide the plate in its vertical movement, instead of employing the projection $v^3$ and groove $u^5$ above referred to. $w^1$ represents a similar block, which is loosely attached to the plate $v$, and by means of the thumb-screw $w^2$ is thus adapted for adjustment in the horizontal slot $v^4$, as shown. $w^3$ represents a head-line strip, of any suitable length and thickness, which is supported by the blocks $w$ $w^1$, as shown. $x$ represents a follower-block or forcer, adapted in length to the width of the column, and supported by the spring-plate $x^1$, loosely but securely held upon the upper ends of the galley-sides, as shown. $x^2$ $x^2$ represent set-screws, projecting from the upper side of the follower-block $x$, and bearing against the under side of the spring-plate $x^1$, as shown, by means of which the relative movement of the follower-block, after it has been depressed, is determined and made uniform, so that, when the block is in its normal position, its lower surface will always coincide accurately with the upper member of the composing-stick, and furnish a proper bearing-surface for the line of types moved into the galley. $x^4$ represents a lever, pivoted at one end to the adjustable side of the galley, which is adapted, when operated, to depress the follower $x$, as indicated in Fig. 8. $x^5$ represents a screw, adapted for vertical adjustment, by means of which the downward movement of the lever is determined, and, consequently, also the movement of the follower-block $x$, and also the distance that the type is depressed in the galley when the lever is operated. $x^6$ represents a spring-stop, attached to the plate upon the standard, by means of which the galley is held in position when in use. By depressing this stop the galley may be readily removed, when desired.

XIII. *The space-holder.*—$y$ $y$, Figs. 1, 8 and 9, represent space-holders adapted to hold the spaces, quadrats, and hyphens usually required for spacing and justifying lines. These are preferably placed, for convenience, adjoining and parallel to the outer wall of the type-case, about three-fourths of an inch apart, and having the same inclination as the type-case and copy-holder. These are each preferably formed of two strips of metal, and an intermediate spacing-bar, of suitable width, the whole being securely fastened together, so as to form a channel sufficiently deep for the reception of the spaces, quadrats, and types which are placed therein, one on top of the other, with their nicked edges uppermost. $y^1$, Fig. 9, represents a gage, provided with a recess, $y^2$, which is attached to the side strips of the channel, and so arranged relatively to the base of the holder, that sufficient space is left between them for the passage of but a single space, type, or quadrat at the same time.

It is evident, from the shape, construction, and position of the channels and gage just described, that if the operator place his thumb and forefinger upon the sides of the holder at the open space he can readily withdraw one of the desired spaces, without being able to remove more than one at a time.

This operation also draws out the next lowest space until it enters the recess of the gage, in which position, however, it is held until the first is removed, when it falls into proper position for removal the next time.

The foregoing description has related to the separate mechanisms of the machine, and their operation. I will now proceed to describe the harmonious action of the several parts in their joint operation.

The main shaft is given a rapid continuous revolution from any suitable source, and, by means of it, the other moving parts are caused to operate continuously, as hereinbefore described in detail. It being desired to set type, one, two, or more character-buttons, of the keys selected by the operator, are depressed. This action, in consequence of the rapidity of the movement of the machine, as before described, is permitted almost at any instant, but still only at the time when the auxiliary time-lock has unlocked the selecting mechanism, and when the setting of a type is rendered absolutely certain. By the depression of the buttons the rear ends of the keys are elevated, and the corresponding type-forcers are given their full initial movement. This movement, in consequence of the operation of the time-lock, is so given that the forcers are brought within range of the continuously-moving carrier in ample time to be carried forward by it, the forcers being held in their proper position, first by the rear ends of the selecting-keys, and then by the guard-plate, which swings in behind them before the selecting-keys are entirely removed, the guard-plate, in its turn, retaining them in place until they are taken from it by the carrier. The forcers, being moved forward by the carrier until it revolves away from them, are thus given a longitudinal movement sufficiently great to force their respective types completely into the race. Behind these types thus injected into the race rises the automatic gate, which effectually prevents any rearward movement upon their part, and furnishes a proper bearing for the support of their feet as they are swept upon their edges sidewise into the line of composition by the type-driver.

The movement of the type-driver is in harmony with that of the other parts, so that it does not advance in its forward movement for the purpose of composing the type until they are completely forced into the race, and, after performing this office, and placing them in the line of composition, it moves backward out of the way to permit other type to be presented, as before.

After the forcer has completed its movement, as before described, it is returned to its normal position by the operation of the lower carrier before the complete revolution of the machine, so that the same selecting-keys and forcers may be used successively, if desired.

If a key is undesignedly or accidentally moved in the rapid manipulation of the keys and only partially depressed, the corresponding forcer will receive but an incomplete initial movement, and consequently will not pass beyond the line of the movement of the guard-plate, but will be inevitably returned to its normal position without setting a type.

The relative movement of the cam for depressing the arms and consequently the rear ends of the keys, and that of the guard-plate which returns the incompletely-moved forcers to their normal position, is such that the rear ends of the keys are withdrawn from their raised position slightly in advance of the backward movement of the forcers, by which means the parts are separated, and the forcers are free to move without coming in contact with said keys.

Some of the advantages of the described construction are as follows: The construction of the machine is such that all the movements given to the types are positive in their character, the same not being permitted to fall or slide by their own weight. The types are moved the shortest distance possible, each being forced out of the case into the race the distance of the type's length, or a trifle more, and then moved upon their edges in a sidewise direction a trifle beyond the outer wall of the type-case, never requiring to be turned in any way, but appearing almost instantaneously before the eye of the operator in the line of composition.

The parts are so constructed, also, that the movements of the machine may be made with great rapidity, and still it will be absolutely certain in its results. By means of the laterally-adjustable division-strips the laterally-adjustable keys, the adjustable race, and the removable buttons, the machine may be readily changed, if desired, to suit different fonts or sizes of types, or to permit changes in the relative position of the letters.

The employment of rotary carriers is desirable, because their movements are continuous, and they may be run at a high rate of speed without danger of injury to themselves or the machine, a result impossible when a reciprocating carrier is employed.

This machine having only one key-board, one type-case, one type-race or composing-stick, and one type-driver, is adapted to place a number of letters into the line of composition, at each impulse of the machine, as rapidly, correctly, and certainly as one, so that by a judicious arrangement of the key-board, having proper regard to the derivative character of our language and the relative value of the combinations of letters, a large number of prefixes, roots, and terminals in constant and frequent use, may be each set as readily as a single letter.

When it is understood that the setting of a single letter is performed much more rapidly than it can be done by hand manipulation this capacity of the machine to set combinations of letters will be appreciated. An illustration of this action is given in Figs. 7, 22, and 23, in which the word "them" is represented as composed or set at a single impulse.

In the foregoing specification I have described minutely the construction of my machine, but do not wish to be understood, therefore, that I limit myself to the special construction shown and described, as many modifications can readily be made without departing from the spirit of my invention.

Having thus fully described my invention, what I claim as new, and desire to secure by Letters Patent, is—

1. The combination of a type-case adapted to support the types edge upon edge, a type-forcer actuated by a power independent of the selecting-keys, and a type receiving and supporting device, said devices being so combined and arranged that the type shall be sustained in the position of composition throughout all of their movements, substantially as described.

2. A selecting-key accomplishing the initial movement of the type-forcer, an independent mechanism for actuating the forcer to deliver the type, a type-case supporting the types edge upon edge, a type-receiving race of a width equal to the gage of the type, whereby each differing character or type is perfectly supported, and a driver to gather or compose and deliver the types, said mechanisms being adapted to support and operate upon the types, so as to preserve the position of composition during all of their movements, substantially as described.

3. The combination of type-forcers actuated by power independent of the motion of the selecting-keys, a type-case supporting the types edge upon edge, and an open-faced race equal to the gage of the font, whereby the position of composition is preserved, and the types are projected within the vision of the operator, substantially as described.

4. The combination of the type-forcers actuated by a power independent of the motion of the selecting-keys, a type-case supporting the types edge upon edge, a type race or conduit adapted to the gage of the font, and a driver or plunger for gathering and delivering the types into the line of composition, the correlation and operation of the parts being such that the types preserve the position of composition during all their movements, substantially as described.

5. A compound time-lock for controlling the movements of the selecting-keys, viz., one mechanism which shall successively lock and unlock the keys, which unlocked condition is limited in duration by a second mechanism, which also locks the keys when none are depressed at the setting moment, or that time when the keys are unlocked, so as to be depressed, substantially as described.

6. The combination of the compound time-lock for controlling the movements of the selecting-keys, as described, with the forcer, the independent power mechanism, and the guard-plate, substantially as described.

7. An auxiliary type-forcer-retracting mechanism or guard-plate, acting independently of the main forcer-retracting mechanism, whereby a forcer partially, accidentally, improperly, or inefficiently started in its initial movement is returned to its normal position, substantially as described.

8. The combination of the auxiliary type-forcer-retracting mechanism or guard-plate with the type-forcer-actuating mechanism, such mechanisms being so actuated, related, and timed as to successively return such forcers as have received an incomplete initial movement, and actuate such as have received their full initial movement, substantially as described.

9. In combination with the forcer and independent power mechanism for moving the forcer, a guard-plate, adapted to retain the forcer in its forward initial position until it is moved by its actuating mechanism, substantially as described.

10. A continuously-revolving actuating device, adapted to give the forcer, projected within the range of its movement by the selecting mechanism, its farther forward or complete movement, for the purpose of delivering the type into the race, substantially as described.

11. A continuously-revolving type-forcer-retracting mechanism, adapted to return a type-forcer to its normal position, substantially as described.

12. The combination of the type-forcer-actuating mechanism, with the type-forcer-retracting mechanism, and the intermediate type-forcer, the said mechanisms being adapted to give the forcer its forward and backward movement, substantially as described.

13. A rotating type-forcer mechanism, the cams of which bear upon and successively lock and unlock the mechanism which operates the ejectors, substantially as described.

14. The combination of the key-controlling arms P, having faces coinciding with, and bearing directly upon, their actuating-cams and front or rear ends, carrying a transverse bar, adapted to bear directly upon the keys, substantially as described.

15. The combination of the cams H, the spring-bolts $q$, the arms P, having the transverse holding-bar $p$, and the selecting-keys $b$, substantially as described.

16. The type-case, constructed with laterally-adjustable division-strips, in combination with the laterally-adjustable keys, substantially as described.

17. In a type-setting machine, the combination of the series of finger-keys and the intermediate fixed washers of hook-shaped form, the latter being adapted to prevent one key from being moved by friction with another, and also to be readily removed when desired, substantially as described.

18. The combination of the selecting-keys, the hooked-shaped washers $b^6$, and the clamping-bar $b^7$, substantially as described.

19. The type-ejector and automatic gate, so combined for conjoint co-operation as to deliver a type into the race and confine it there during its delivery into the composing-stick by the type-driver, substantially as described.

20. In combination with the type-race, the automatic gate, adapted to operate substantially as described, for the purpose set forth.

21. Two or more dividers, adjustable longitudinally, and located in different horizontal planes, being adapted to enter successively the line of type and "break" it into lines of any desired length, substantially as described.

22. A type-conduit, consisting of upper and lower supporting-plates, which conduit is divided into two sections, the plates of one constituting the type-receiving race, and being made adjustable in fixed positions to adapt it to different fonts of type, and the plates of the other constituting the justifying portion, being adjustable to suit the conditions required during both composition and justification, substantially as described.

23. The justifying-section of the composing-stick, consisting of the fixed bed-plate and the loose vertically-moving upper plate, the latter gravitating to slightly press the line of type while under justification, substantially as described.

24. The combination of the fixed plate and vertically-reciprocating upper plate of the composing-stick, with a suitable locking mechanism whereby the opening in the composing-stick is fixedly adjusted during the operation of composing the type, as described.

25. A space-holder provided with a supporting-ledge and a gage-plate to prevent the passage of more than one space at a time, so combined with its supporting frame or bed as to permit the fingers to grasp a space on its opposite sides in the act of removing it from its holder, substantially as described.

26. A galley carrying a follower-block, side stick, and head-block, with means for their actuation and adjustment, and which also has an opening through one side plate which coincides and communicates with the type-race, the construction being such as to render the galley removable without displacing the correlation of any of the devices it carries.

27. The combination of the follower-block $x$, the supporting-spring $x^1$, and the adjustable supporting-screws $x^2\ x^2$, whereby the upward movement of the block is determined, substantially as described.

28. A type-case having a flanged bottom ledge, $i$, and a flanged clamping-bar, $k$, upon which the recessed division-strips L are laterally adjustable, said strips being adapted to support at suitable distances apart the case-plates J, forming the type-channel, substantially as described.

29. The bed or frame I, laterally-moving division-strips L, case-plates J, and adjusting-screws $J^3$, combined and arranged as described.

JAMES W. PAIGE.

Witnesses:
DEXTER REYNOLDS,
D. L. JOHNSTON.